US005423990A

United States Patent [19]

Michiels et al.

[11] Patent Number: 5,423,990

[45] Date of Patent: Jun. 13, 1995

[54] METHOD FOR THE PURIFICATION OF WASTE WATER CONTAINING SILVER

[75] Inventors: Eddy Michiels, Duffel; Frank Michiels, Arendonk, both of Belgium; Dmitry A. Topchiev; Gennady G. Kardash, both of Moscow, U.S.S.R.

[73] Assignee: AGFA-Gevaert, N.V., Mortsel, Belgium

[21] Appl. No.: 175,512

[22] Filed: Dec. 30, 1993

[30] Foreign Application Priority Data

Apr. 5, 1993 [EP] European Pat. Off. ........... 93200956

[51] Int. Cl.$^6$ ........................... C02F 1/62; C02F 1/54; C02F 1/56

[52] U.S. Cl. .................................... 210/669; 210/727; 210/729; 210/732; 210/734; 210/912

[58] Field of Search ............... 210/666, 669, 729, 912, 210/734, 732, 727; 75/739, 741

[56] References Cited

U.S. PATENT DOCUMENTS

| | | | |
|---|---|---|---|
| 4,155,810 | 5/1979 | Kitajima et al. . | |
| 4,755,453 | 7/1988 | Kunda et al. | 210/912 |
| 4,814,007 | 3/1989 | Lin et al. | 210/688 |
| 4,874,530 | 10/1989 | Kobayashi et al. | 210/912 |
| 4,895,597 | 1/1990 | Lin et al. | 210/904 |
| 4,992,200 | 2/1991 | Lin et al. | 75/723 |
| 5,028,259 | 7/1991 | Lin et al. | 75/722 |
| 5,078,978 | 1/1992 | Tarbet et al. | 210/912 |

*Primary Examiner*—Neil McCarthy
*Attorney, Agent, or Firm*—Breiner & Breiner

[57] ABSTRACT

A process is disclosed for the purification of waste water containing a silver compound, comprising the steps of (1) adding to said waste water a salt of a poly(-guanidine) or poly(biguanidine) polymer (2) adding a flocculant, and (3) filtrating the formed flocculate.

The invention is particularly suitable for the removal of silver from the effluent of a photographic processor, and more specifically the effluent of a processor of wash-off materials, said effluent also containing gelatin.

A most preferred poly(guanidine) compound is poly(-hexamethyleneguanidine) hydrochloride.

11 Claims, No Drawings

METHOD FOR THE PURIFICATION OF WASTE WATER CONTAINING SILVER

DESCRIPTION

1. Field of the Invention

The present invention relates to a method for the purification of waste water, and more particularly for the removal of silver from the effluent of a photographic processor, said effluent also containing gelatin.

2. Background of the Invention

For simplicity's sake, the terms "silver" or "silver compound" are both used for the set of all forms of silver present in solution, e.g. free silver ions and complexed silver ions, e.g. silver thiosulphate complex or silver thiocyanate complex, colloidal silver, etc.

Processes for the recovery of silver in the photographic industry are well known. The techniques which are most widely used for the removal and recovery of silver from spent photographic solutions are electrolysis on the one hand, which is most often used in the particular case of silver recovery from spent silver-rich photographic fixing solutions, and the use of ion-exchange columns on the other hand. A survey of methods on silver recovery can be found in *Journal of Imaging Technology* Vol. 11, No. 2, April 1985, pp. 43–50. In the same issue of this jounal on pp. 51–58 the use of ion-exchange techniques is reviewed. In the technique of electrolysis the recovered fixing solutions are usually subsequentely reused, not discarded. On the contrary the technique of electrolysis is not used to recover silver from photographic solutions which are to be finally discarded, because it fails in almost all cases to yield effluents that are into compliance with anti-pollution regulations. The technique of using ion-exchange resins on the other hand has the disadvantage that it cannot be used when substantial amounts of gelatin are present in the photographic waste water, because of either clogging of the ion-exchange column and/or the development of disagreeable odours when gelatin fractions deteriorate on the ion-exchange column. These problems are increased when recovery of silver is attempted from processor effluent in instances where a wash-off type film is used, i.e. a film where development of an image involves washing-off the unhardened parts of the emulsion layer containing silver halide and gelatin by means of e.g. a spray of hot water. In many of those cases water rich in silver will be flushed down at substantial rates into the sewerage, often in violation of the local pollution control laws.

It is the object of the present invention to provide an inexpensive, easily implementable process for the removal of silver from waste water, more particularly from the effluent of a processor of photographic material, said process being unhindered by the presence of substantial amounts of gelatin in the effluent.

3. Summary of the Invention

The object of the present invention is realized by providing a process comprising the steps of (1) adding to waste water containing silver, a solution of a salt of a poly(guanidine) or poly(biguanidine) polymer corresponding to general formula (I) or (II):

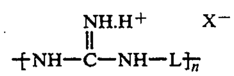

(I)

-continued

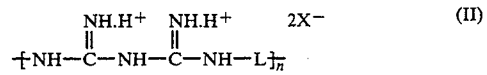

(II)

wherein L represents a divalent aliphatic or aromatic, linear, branched or cyclic linking group, $X^-$ represent an anion, and n is at least 5, (2) flocculating the polymer out of solution together with the bound silver compound, using a suitable flocculant, and (3) filtrating the flocculate, whereby silver and gelatin., when present, are separated and held in the filter, and the filtrate consists of substantially silver-free liquid. In a preferred embodiment the filtration is performed in a continuous way. The filtered liquid can be immediately discarded or, in an alternative embodiment, it may be first guided over a suitable ion-exchange column before being discarded or recycled.

The invention is particularly suitable for the removal of silver from the effluent of a photographic processor, and more specifically the effluent of a processor of wash-off materials, said effluent also containing gelatin.

A most preferred poly(guanidine) polymer is poly(-hexamethyleneguanidine) hydrochloride, corresponding to formula (I-1):

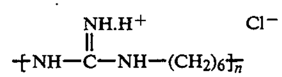

wherein n is at least 5.

Preferred flocculating agents are compounds containing a sulphonate or sulphate group, e.g. polystyrene sulphonate and N-methyl-N-oleyl-taurine. In a particular embodiment a flocculation aid can be used.

In this way a rapid, simple and economical process is provided which yields aqueous effluents in compliance with up-to-date severe anti-pollution regulations.

4. Detailed Description of the Invention

Any waste water containing silver can be purified by the process of the present invention. The method is especially suitable for the removal of silver from the effluent of a photographic processor in which so-called wash-off materials are processed. In this case gelatin is also present in the effluent emanating from the unhardened portions of the photographic material which are removed from the support in the wash-off step. For instance, in the colour proofing system AGFAPROOF, comprising particular materials and processors marketed by Agfa-Gevaert N. V., such a wash-off step occurs at the end of each processing cycle. The preferred embodiment in which the effluent contains both silver and gelatin will be described now in detail.

It is believed that the silver compounds present interact with the poly(guanidine) compounds according to formula (I) or (II) and are thus bound to it. A most preferred compound is poly(hexamethyleneguanidine) in its hydrochloride or sulphate salt form of which the former salt form is most preferred.

The poly(guanidine) polymers used in accordance with the present invention can be prepared by a polycondensation reaction of guanidine and a diamine. The synthesis of poly(hexamethyleneguanidine) hydrochloride has been described in *Khim. Prom-st.* (*Moscow*), (12), pp. 903–5. The substance has been used in a process for the recovery of Uranium from ocean water as disclosed in *Khim. Tekhnol. Vody*, 12 (2), pp. 171–3.

To a batch or to a continuously supplied volume of effluent a metered amount of an aqueous solution of a salt of a poly(guanidine) polymer according to formula (I) or (II), preferably the hydrochloride or sulphate salt, is added while continuously mixing.

In a second step an aqueous solution of a suitable flocculant is added while continuously mixing. This flocculant flocculates the poly(guanidine) polymer of formula (I) or (II) together with the bound silver compounds out of solution. The selection of the actual flocculant used is largely empirical. Preferred compounds are substances bearing at least one sulphonate or sulphate group. Most preferred substances are polystyrene sulphonate and N-methyl-N-oleyltaurine. Other useful compounds include lignosulphonate. Also a combination of two or more flocculants can be used. In a particularly preferred embodiment of this invention a combination of sodium polystyrene sulphonate and N-methyl N-oleyltaurine is used, because it allows to obtain a precipitate which is compact, granular and easy to filtrate in the subsequent step.

Although not strictly necessary, the use of one or more so-called flocculation aid(s) can be considered if one chooses to influence the characteristics of the formed flocks. Examples of such flocculating aids, well known to those skilled in the art, are e.g. high molecular weight polyacrylamides and the like, or di- or preferrably trivalent salts such as aluminium sulphate.

In a subsequent step the flocculated effluent is filtered, whereby silver and gelatin are separated and held in the filter, and substantially silver-free filtrate is obtained. It is understood that any filtering arrangement capable of removing the flocks is acceptable. The filtration can be performed batch-wise, or more preferably in a continuous way. A preferred way of filtrating comprises the use of a commercially available automatic filtering unit wherein a filter fabric, available in a range of porosity of 1 to 125 μm, is supplied from a roll driven by a motor. The motor is controlled by a sensor and is automatically advanced to remove used sections of the filter and thus providing fresh filter fabric. The used portion of the filter web, i.e. the portion covered by sludge comprising flocculated poly(guanidine) polymer, silver and gelatin, is collected, either in a tray or re-rolled in a cassette, depending on the actual apparatus used (e.g. PAPER BAND FILTER FSE10-FILTERMAT BELGIUM BVBA). It is worthwile mentioning that no significant differences of the silver concentration in filtrates were found, when filters of pore sizes of 0.22 μm, 0.45 μm, 0.8 μm, 1.2 μm, 3.0 μm, 5.0 μm or 10 μm were used. This shows that using the procedure of this invention, a flock size is obtained which is large enough to be quantitatively removed by the various filters with the pore sizes mentioned.

Another advantage of the procedure described in this invention is the fact that, probably because the flocculated mass acts as a 'floating filter' it is observed that the final filtrate is clear and essentially colourless. In other words, starting from a heavily coloured wash-off film processor effluent, such as the one resulting from the processing of AGFAPROOF material comprising four differently coloured sheets, containing coloured compounds, gelatin and silver, the process of this invention yields a filtrate which is not only substantially free of silver and gelatin, but in which also the coloured compounds have been removed to a very large extent. As stated above the filtered liquid can be immediately discarded or can be first guided over an ion-exchange resin as an additional purification step.

The following examples illustrate the present invention without however limiting it thereto.

EXAMPLES

EXAMPLE 1

Using a peristaltic pump (VERDER), a flow of 0.166 l/min of effluent of a wash-off film processor, having a silver content of 58 mg/l, was fed into a first in-line static mixer. Using a METROHM DOSIMAT 655, a flow of 3.17 ml/min of an aqueous solution (40 percent by weight) of poly(hexamethyleneguanidine) hydrochloride was fed into the same entrance of the first in-line static mixer. The flows mentioned are sufficient to yield an adequate Reynolds number, in order to ensure efficient mixing. The effluent of said first in-line static mixer was fed into a second in-line static mixer, together with a flow of 3.07 ml/min of an aqueous solution (5 percent by weight) of N-methyl N-oleyl-taurine. The latter flow was fed into the second in-line static mixer using a second METROHM DOSIMAT 655. The effluent of the second in-line static mixer was continuously filtered through a paper band filter (PAPER BAND FILTER FSE10-FILTERMAT BELGIUM BVBA) with pore size of 10 μm. The silver content of the filtrate was 2.1 mg/l as determined by atomic absorption spectroscopy.

EXAMPLE 2

An amount of 0.5 ml of an aqueous solution which contained 40 percent by weight of poly(hexamethyleneguanidine) hydrochloride was added, whilst stirring, per amount of 50 ml of waste water effluent, containing 58 ppm of silver, of a wash-off film processor. In a subsequent step an amount of 0.1 ml of a solution containing 40 percent by weight of sodium polystyrene sulphonate was added per original amount of 50 ml of the waste effluent, immediately followed by addition of an amount of 0.5 ml of a solution containing 5 percent by weight of N-methyl-N-oleyl-taurine per original amount of 50 ml of the waste water. Also while performing this second step in the procedure continuous stirring went on. In a third and final step a filtration was performed using a MILLIPORE filter, type SM (manufactured by Millipore S. A. France) with a pore size of 5 μm. The filtrate contained 2.5 ppm of silver as determined by atomic absorption spectrometry.

EXAMPLE 3

An amount of 1.0 ml of an aqueous solution which contained 2 percent by weight of poly(hexamethyleneguanidine) hydrochloride was added, whilst stirring, per amount of 50 ml of waste water effluent, containing 6.9. ppm of silver, of a wash-off film processor. After continuously stirring for about five minutes, an amount of 1 ml of a solution containing 2 percent by weight of sodium polystyrene sulphonate was added per original amount of 50 ml of the waste effluent whilst further stirring for about five minutes. In a third and final step a filtration was performed using a MILLIPORE filter, type SM with a pore size of 0.45 μm. The filtrate contained a concentration of 0.3 ppm of silver as determined by atomic absorption spectrometry. When this experiment was repeated with varying stirring times during each step, e.g. two minutes, one minute or ten minutes, the final silver concentrations in the filtrate remained essentially the same.

EXAMPLE 4

An amount of 20.0 ml of an aqueous solution which contained 2 percent by weight of poly(hexamethyleneguanidine) hydrochloride was added, whilst stirring, per amount of 50 ml of waste water effluent, containing 46.8 ppm of silver, of a wash-off film processor. After continuously stirring for five minutes, an amount of 20 ml of a solution containing 2 percent by weight of sodium polystyrene sulphonate was added per amount of 50 ml of the waste water effluent in a subsequent step, also while continuously stirring. In a third and final step a filtration was performed using a MILLIPORE filter, type SM with a pore size of 0.45 μm. The filtrate contained 0.8 mg/l of silver as determined by atomic absorption spectrometry.

We claim:

1. Process for the purification of waste water containing-silver, comprising the steps of (1) adding to said waste water a salt of a poly(guanidine) polymer or poly(biguanidine) polymer corresponding to general formula (I) or (II):

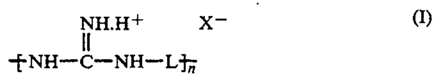

(I)

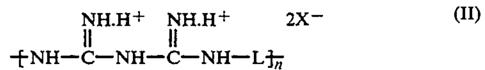

(II)

wherein L represents a divalent aliphatic or aromatic, linking group, $X^-$ represent an anion, and n is at least 5, (2) adding a flocculant, and (3) filtering the formed flocculate.

2. Process according to claim 1 wherein said waste water containing silver additionally contains gelatin.

3. Process according to claim 1 wherein said waste water is the effluent of a processor of photographic material.

4. Process according to claim 3 wherein said effluent emanates from the processing of a wash-off type photographic material.

5. Process according to claim 1 wherein said salt of a poly(guanidine) polymer is poly(hexamethyleneguanidine) hydrochloride or sulphate.

6. Process according to claim 1 wherein said flocculant is a compound bearing at least one sulphonate or sulphate group.

7. Process according to claim 6 wherein said flocculant is polystyrene sulphonate or N-methyl-N-oleyl-taurine or a mixture thereof.

8. Process according to claim 1 wherein a flocculation aid is added together with the flocculent before the filtration step.

9. Process according to claim 8 wherein said flocculation aid is high-molecular weight polyacrylamide or aluminium sulphate.

10. Process according to claim 1 wherein said filtration step is performed by means of a band filter of fine mesh filter fabric.

11. Process according to claim 1 wherein said process comprises a subsequential step consisting of passing said filtrate over an ion-exchange column.

* * * * *